(12) United States Patent
McKee et al.

(10) Patent No.: US 7,823,938 B2
(45) Date of Patent: Nov. 2, 2010

(54) BUMPER FACEPLATE WITH PORTS

(75) Inventors: Christopher McKee, Marysville, OH (US); Chris Stoffel, Powell, OH (US); Nick Massaro, Dublin, OH (US); Steve Kovach, Dublin, OH (US); Damon Schell, Redondo Beach, CA (US); Michelle Christensen, Pasadena, CA (US); Christopher Bao, Los Angeles, CA (US); Travis Watkins, Sebastian, FL (US)

(73) Assignee: Honda Motor Co., Ltd., Tokyo (JP)

( * ) Notice: Subject to any disclaimer, the term of this patent is extended or adjusted under 35 U.S.C. 154(b) by 190 days.

(21) Appl. No.: 12/253,402

(22) Filed: Oct. 17, 2008

(65) Prior Publication Data

US 2010/0096865 A1  Apr. 22, 2010

(51) Int. Cl.
*B60R 19/02* (2006.01)
(52) U.S. Cl. .................................. 293/102; 293/113
(58) Field of Classification Search ................. 293/102, 293/117, 120, 142; 180/274; 362/505; 267/139; 296/191, 187.09
See application file for complete search history.

(56) References Cited

U.S. PATENT DOCUMENTS

| | | | | |
|---|---|---|---|---|
| 2,841,232 A | * | 7/1958 | Loeffler | 293/113 |
| 2,856,020 A | * | 10/1958 | Hoagg et al. | 180/309 |
| 2,979,357 A | * | 4/1961 | Leach et al. | 293/113 |
| 2,992,035 A | * | 7/1961 | Tell et al. | 293/113 |
| 4,387,920 A | | 6/1983 | Slaughter et al. | |
| 4,466,646 A | | 8/1984 | Delmastro et al. | |
| 4,563,028 A | | 1/1986 | Ogawa et al. | |
| 4,653,788 A | | 3/1987 | Di Giusto | |
| 4,996,634 A | | 2/1991 | Haneda et al. | |
| 5,060,122 A | | 10/1991 | Miyoshi | |
| 5,066,057 A | | 11/1991 | Futura et al. | |
| 5,288,117 A | * | 2/1994 | Vogelgesang | 293/117 |
| 5,321,214 A | | 6/1994 | Uegane et al. | |
| 5,460,420 A | | 10/1995 | Perkins et al. | |
| 5,833,283 A | * | 11/1998 | Shaw | 293/121 |
| 5,988,714 A | | 11/1999 | Akazawa et al. | |
| 6,428,186 B1 | * | 8/2002 | Yoneyama | 362/265 |
| 6,802,547 B2 | | 10/2004 | Schmid | |
| 6,945,576 B1 | | 9/2005 | Arentzen | |
| 6,962,230 B2 | | 11/2005 | Hanaya et al. | |
| D549,629 S | | 8/2007 | Davidson | |
| 7,255,377 B2 | | 8/2007 | Ahn | |
| D567,714 S | | 4/2008 | Sawai | |

(Continued)

FOREIGN PATENT DOCUMENTS

JP          03-135854          6/1991

(Continued)

OTHER PUBLICATIONS

International Search Report.

(Continued)

*Primary Examiner*—Kiran B. Patel
(74) *Attorney, Agent, or Firm*—Mark E. Duell, Esq; Emerson Thomson Bennett

(57) ABSTRACT

The use of a bumper faceplate with ports provides for the easy assembly, increased structural strength, and dramatically improved aesthetic appearance of an assembled bumper containing bumper components.

10 Claims, 4 Drawing Sheets

U.S. PATENT DOCUMENTS 7,458,440 B2 * 12/2008 Uegane ................. 181/228
7,686,131 B1 * 3/2010 Osterkamp et al. .......... 293/113

FOREIGN PATENT DOCUMENTS

| JP | 02-6-5891 | 2/1997 |
| JP | 10287172 | 10/1998 |
| JP | 2002154395 | 5/2002 |
| JP | 3692704 | 9/2005 |

OTHER PUBLICATIONS

Written Opinion, dated May 25, 2010.

* cited by examiner

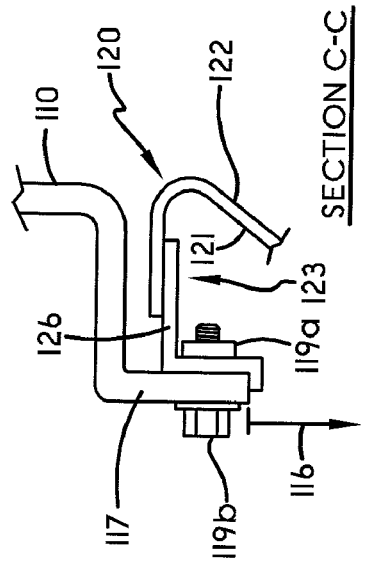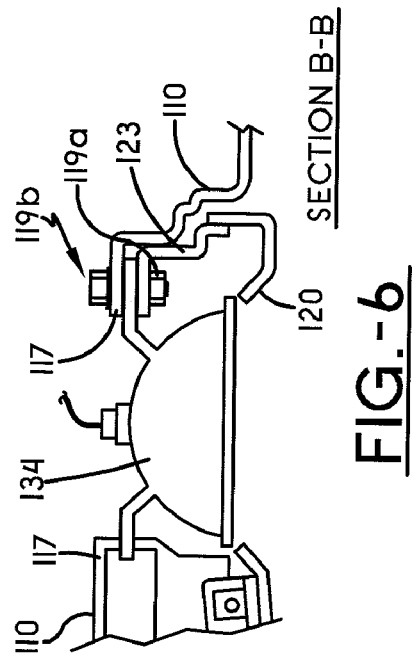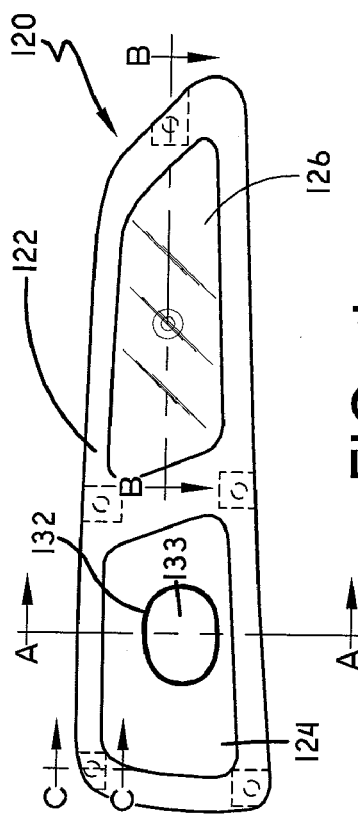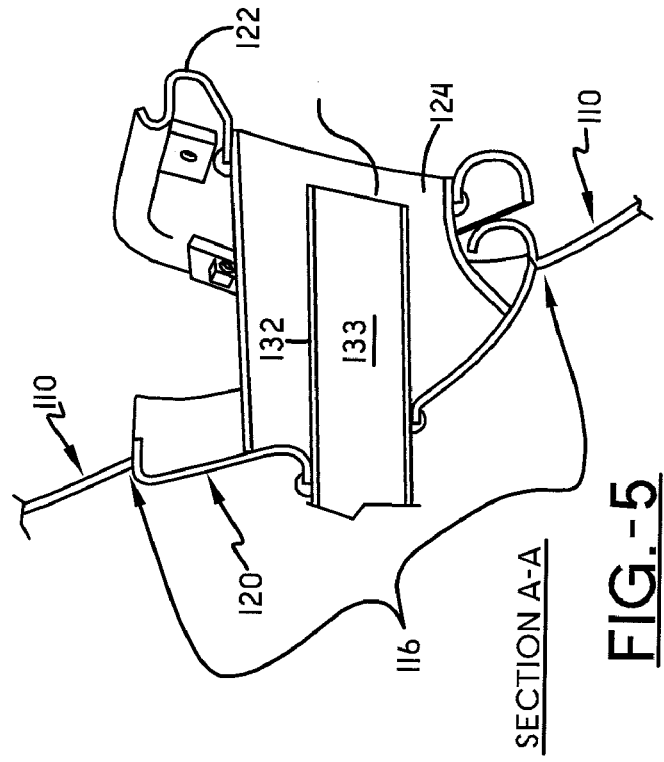

BUMPER FACEPLATE WITH PORTS

I. BACKGROUND OF THE INVENTION

A. Field of Invention

This invention pertains to the art of methods and apparatuses regarding automotive vehicle bumpers, and more specifically to methods and apparatuses related to the integration of vehicle bumper components.

B. Description of the Related Art

The use of automotive vehicle bumpers is well known in the art. These structures, which can be manufactured using a wide variety of materials, are generally attached to the vehicle body in an arrangement that absorbs energy in a collision. While bumpers typically are independent components, it is also known to integrate other vehicle components with a bumper. It is known, for example, to integrate an exhaust component, sometimes referred to as an "exhaust finisher," into the structure of a vehicle bumper. The exhaust finisher forms a portion of the exhaust conduit and permits exhaust fumes to be discharged through the bumper. It is also known in the art to integrate other vehicle components into a vehicle bumper. Examples include: lighting elements, air intake channels, video-assist driving instruments, proximity sensors, and other electronic devices.

While known structures that integrate vehicle components into a bumper generally work well for their intended purposes, one disadvantage is that assembly of the vehicle becomes difficult. Another disadvantage to known structures that integrate vehicle components is that often the overall aesthetic appearance of the vehicle bumper is compromised.

The present invention provides methods and apparatuses for a vehicle bumper faceplate with ports that integrate the vehicle exhaust conduit and at least one other vehicle component into the bumper in a structurally stable, aesthetically pleasing, and easy to assemble device.

II. SUMMARY OF THE INVENTION

According to one embodiment of this invention, a vehicle comprises: a vehicle frame; at least one ground engaging wheel supported to the vehicle frame; a locomotion source that: (1) is operatively supported to the vehicle frame; (2) provides locomotion for the vehicle; and, (3) comprises a first gas transfer conduit; at least one vehicle bumper supported to the vehicle frame, the vehicle bumper comprising a first opening; a first light fixture that is operatively supported to the vehicle bumper; a first bumper faceplate that: (1) is operatively attached to the vehicle bumper juxtaposed to the first opening in the vehicle bumper; and (2) has first and second ports; wherein the first gas transfer conduit conveys a gas through the first opening in the bumper and through the first port in the first bumper faceplate; and, wherein the light fixture conveys light through the second port in the first bumper faceplate.

According to yet another embodiment of this invention, a bumper faceplate comprises: an attachment portion that is attachable to an associated vehicle bumper having an opening; a first port for use in conveying a gas: (1) to or from an associated locomotion source on the associated vehicle; and, (2) through the opening in the associated bumper; and, a second port for use in conveying light from an associated light fixture on the associated vehicle.

According to another embodiment of the invention, a method for assembling a vehicle bumper comprises the steps of: (A) providing: a vehicle comprising: (a) a vehicle frame; (b) at least one ground engaging wheel supported to the vehicle frame; (c) a locomotion source that: (1) is operatively supported to the vehicle frame; (2) provides locomotion for the vehicle; and, (3) comprises a gas transfer conduit; (d) at least one vehicle bumper supported to the vehicle frame, the vehicle bumper comprising an opening; and, (e) a first light fixture that is operatively supported to the vehicle bumper; (B) attaching a bumper faceplate having first and second ports juxtaposed to the opening in the vehicle bumper; (C) positioning the gas transfer conduit with respect to the faceplate so that the locomotion source can convey a gas through the opening in the bumper and through the first port in the faceplate; and, (D) attaching the first light fixture with respect to the faceplate so that light is conveyed through the second port in the faceplate.

One advantage of this invention, according to one embodiment, is that both a gas transfer conduit and a light fixture may be integrated into a single, visually appealing, region of the bumper.

Another advantage of this invention is that the structural strength of the bumper is maintained.

Yet another advantage of this invention is that vehicle components can be easily assembled into the vehicle bumper.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 4 is a close-up end view of a bumper faceplate according to another embodiment of this invention.

FIG. 5 is a sectional view taken along line A-A of FIG. 4.

FIG. 6 is a sectional view taken along line B-B of FIG. 4.

FIG. 7 is a sectional view taken along line C-C of FIG. 4.

IV. DETAILED DESCRIPTION OF THE INVENTION

Figure 1:
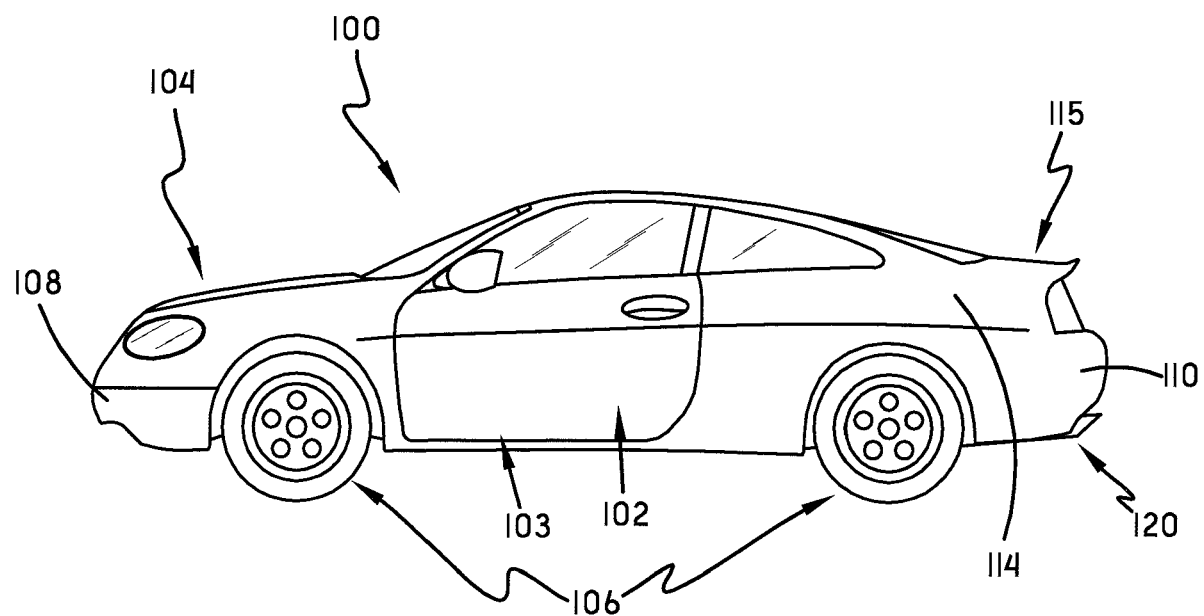
FIG. 1 is a side view of an automotive vehicle.

Referring now to the drawings, wherein the showings are for purposes of illustrating embodiments of the invention only and not for purposes of limiting the same, FIG. 1 illustrates a vehicle 100 having a bumper 110 that may use a faceplate 120 according to one embodiment of this invention. While the vehicle 100 shown is an automobile, it is to be understood that the faceplate 120 of this invention will work with any vehicle including, for some non-limiting examples, automobiles, trucks, motorcycles, aircraft or sea-faring vessels. The vehicle 100 may include a vehicle frame 102 and one or more ground engaging wheels 106 mounted to the frame 102. The vehicle 100 may also include a front bumper 108 and a rear bumper 110 which may be attached directly to the frame 102 or may be attached to a vehicle body 103 that is supported to the frame 102. While the faceplate 120 is shown attached to the rear bumper 110, it should be understood that the faceplate 120 of this invention will work with any bumper, such as front bumper 108 or a side of the vehicle bumper (not shown), when applied with the sound judgment of a person of skill in the art.

With continuing reference to FIG. 1, the vehicle 100 may also have a locomotion source 104, mounted to the frame 102, for use in providing locomotion for the vehicle. The locomotion source could be of any type chosen with the sound judgment of a person of skill in the art including, for some non-limiting examples, an internal combustion engine (ICE), an electric motor, and so called "hybrids" which combine an ICE with an electric motor. The locomotion source 104 may also have at least one gas transfer conduit 132 that transfers a gas to or from, or both to and from, the locomotion source 104. In one embodiment, shown in FIG. 3, the gas transfer conduit 132 is an exhaust tailpipe that discharges exhaust fumes away from the locomotion source 104. In one specific embodiment, the exhaust fumes may be the result of an ICE, as is well known in the art. In another embodiment, the gas transfer conduit 132 is an air intake pipe that takes atmospheric air from outside the vehicle and conveys it to the locomotion source. In one specific embodiment, the atmospheric air may be conveyed to an ICE for use in the combustion process, as is well known in the art. It should also be noted that the use of multiple exhaust tailpipes and/or multiple air intake pipes will also work well with this invention.

Figure 2:
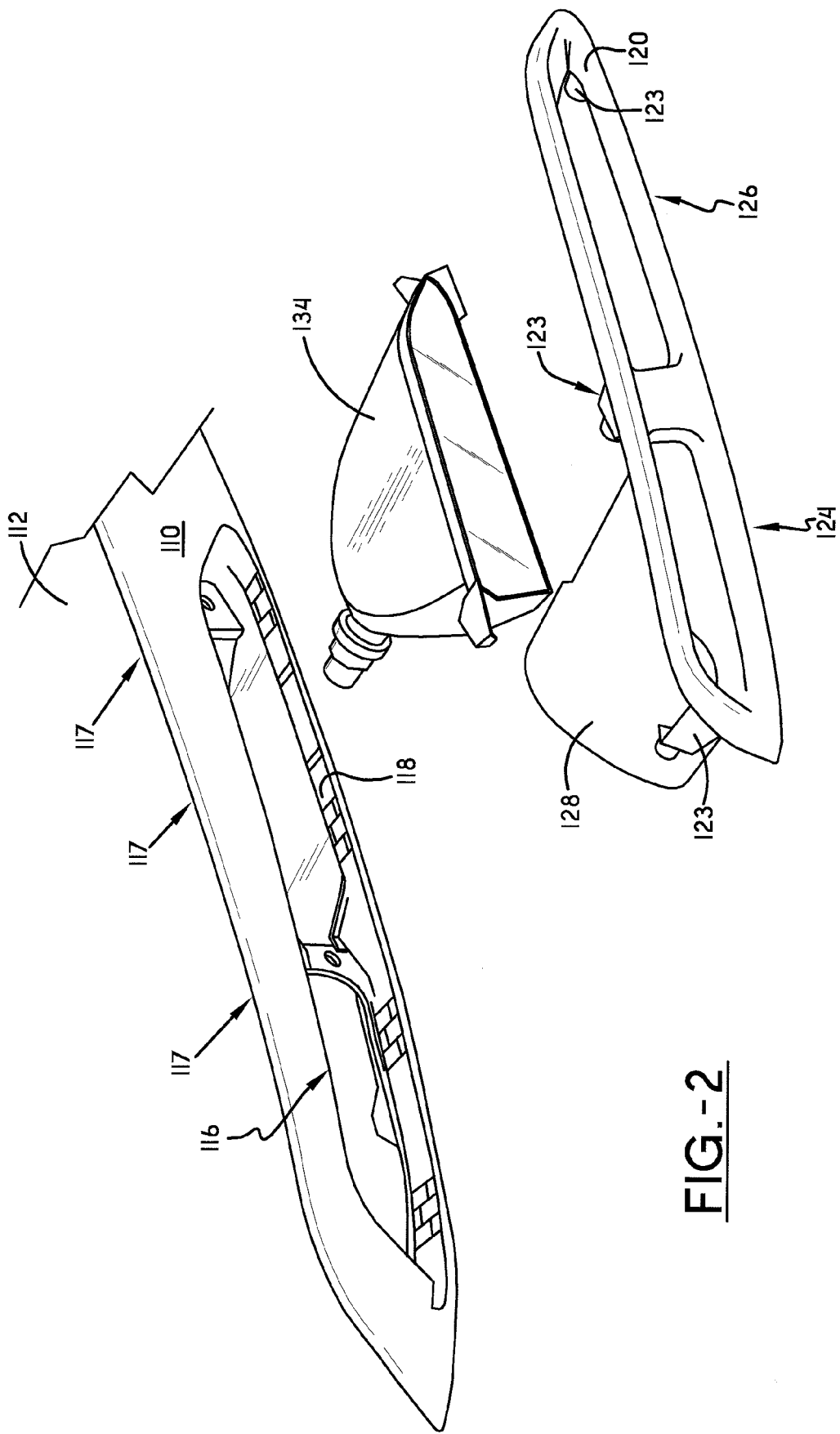
FIG. 2 is an assembly view of a bumper, bumper faceplate, and lamp apparatus according to one embodiment of this invention.

Still referring to FIG. 1, the rear bumper 110 may have an outer wall 112 that wraps around the rear portion of the vehicle frame 104 in a manner that, along with vehicle side panels 114 and a trunk deck 115, defines the rear end of the vehicle body 103. According to various embodiments of the invention, as generally illustrated in FIG. 2, the rear bumper 110 has a first opening 116, extending transversely through the bumper's outer wall 112, which is designed to receive a first bumper faceplate 120 and house bumper components 130. A bumper component 130 is any device capable of residing within a vehicle bumper; with two non-limiting examples being a gas transfer conduit 132 and light fixture 134. The opening 116 may or may not be completely surrounded by the bumper 110. The bumper 110 may have at least one attachment surface 117, which may be positioned around the periphery of the first opening 116, upon which bumper components 130, and the faceplate 120, may be mounted. The attachment method used to attach the bumper components 130 and the faceplate 120 to the bumper 110 may be of any type chosen with the sound judgment of a person of skill in the art, and may include, for a non-limiting example, the use of clips 118 or nuts 119a and bolts 119b. The opening 116 shown in FIG. 2 has an oblong trapezoidal shape, but it is to be understood that the opening 116 can take any shape, consistent with the sound judgment of a person of skill in the art, that is capable of accommodating the chosen bumper components 130 and faceplate 120.

According to one embodiment of the invention, the rear bumper 110 is assembled by positioning the opening 116 over a bumper component 130, in this instance a gas transfer conduit 132 of an associated vehicle, and then mounting the rear bumper 110 directly to the vehicle frame 102, and/or directly to the vehicle body 103 supported by the vehicle frame 102, in a manner consistent with sound judgment. Such a mounting configuration positions the gas transfer conduit 132 within the transverse opening 116 of the rear bumper 110. As illustrated in FIGS. 2 and 6, the second bumper component 130 is a light fixture 134 (in this embodiment, a lamp 135) which is then mounted to the first attachment surface 117 of the rear bumper opening 116, and wired to the associated vehicle electrical system. With both bumper components 130 secured within the rear bumper opening 116, final assembly is completed with the mounting of the bumper faceplate 120.

The bumper faceplate 120 shown in FIGS. 2 and 4, and in a mounting profile in FIG. 7, has an outside surface 122 that defines two openings in the faceplate 120 designed to align, and in some instances mate, with bumper components 130: a first port 124 and a second port 125. The inside surface 121 of the faceplate 120 has an attachment portion 123 that may be of any design chosen with the sound judgment of a person of skill in the art. In one non-limiting embodiment, the attachment portion 123 comprises flanges 126 that—in conjunction with nuts 119a and bolts 119b, as two non-limiting examples—fixedly mount the faceplate 120 to the attachment surface 117 in the rear bumper's opening 116. The shape of the faceplate 120 generally mirrors the shape of the rear bumper opening 116, and is designed in a manner that permits it to be mounted snugly within said opening 116 (as shown in one non-limiting manner in FIG. 7). The assembled configuration, one embodiment of which is shown FIG. 3, improves the rigidity of the rear bumper 110 by reinforcing the rear bumper opening 116, and also provides an aesthetically pleasing integration of bumper components 130 at a specific region.

Figure 3:
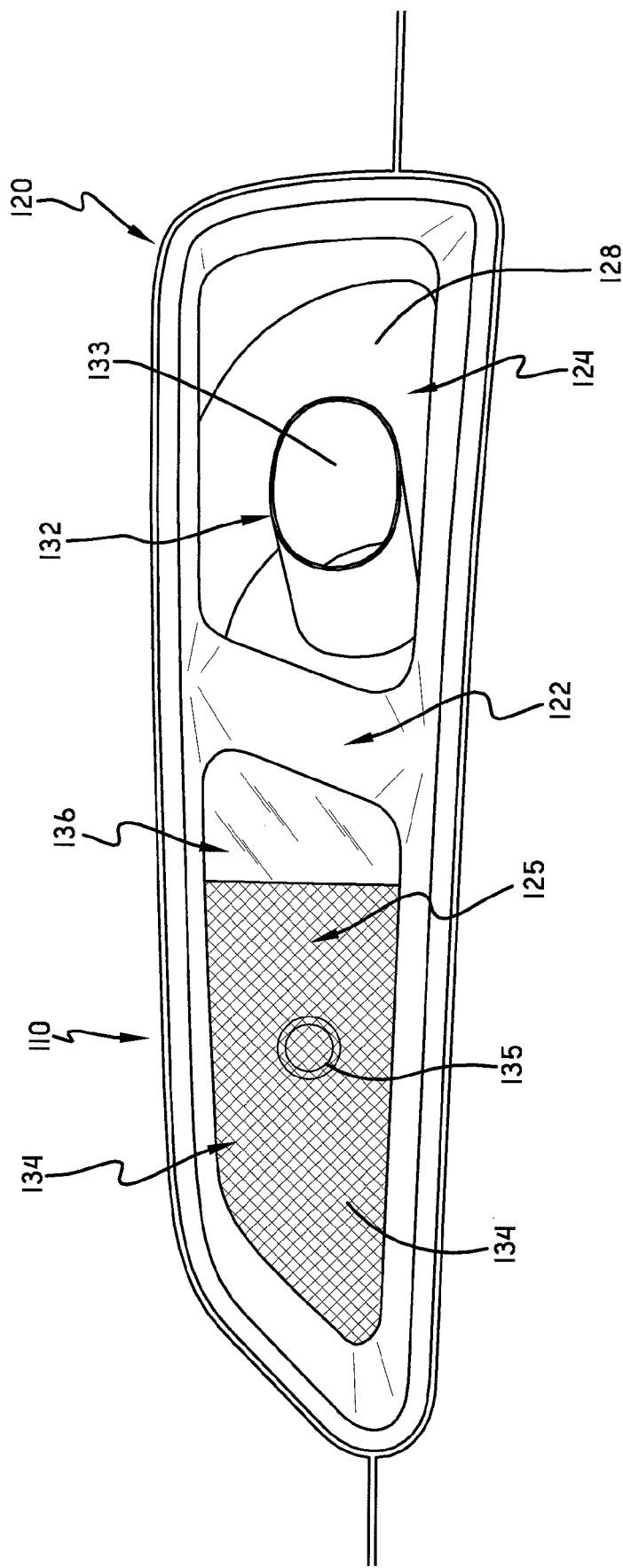
FIG. 3 is a close-up end view of a vehicle using a bumper faceplate according to one embodiment of this invention.

In the embodiment shown in FIGS. 2 and 3, the faceplate's 120 first port 124 is designed to receive a gas transfer conduit 132 that discharges exhaust fumes from the locomotion source 104 through the bumper opening 116, the first port 124, and away from the vehicle 100. In the embodiment shown in FIGS. 2 and 3, the faceplate 120 has a conduit member 128 that extends inward from the outside surface 122 of the first bumper faceplate. As shown in FIG. 3, the conduit member might surround at least a portion of the gas transfer conduit 132. In another embodiment, however, the gas transfer conduit 132 might be operatively mounted to the conduit member 128. In yet another embodiment, one example of which is shown in FIG. 5, the gas transfer conduit 132 might be operatively mounted directly to the bumper faceplate 120. Such configuration allows exhaust fumes from the vehicle's locomotion source 104 to be transmitted through the gas transfer conduit 132 and away from the vehicle 100 via the faceplate's first port 124. In yet another embodiment of the invention, illustrated generally in FIG. 2, the faceplate 120 is designed receive a gas transfer conduit 132 that conveys atmospheric air from outside of the vehicle 100 through the first port 124, the first opening 116 in the bumper 108, and to the locomotion source 104. In yet other embodiments of the invention, the bumper has two openings 116, receives two gas transfer conduits 132 for discharging exhaust fumes, receives at least two light fixtures 134, and has two faceplate's 120 operatively attached as described herein.

As shown in FIG. 3, the faceplate's second port 125 is designed to align with the light fixture 134 mounted to the bumper's attachment surface 117; whereby the light fixture's 134 artificial light is conveyed away from the vehicle 100 through the second port 125. In one embodiment of the invention, the light fixture 134 is a lamp 135. In another embodiment, the light fixture 134 is a reflector 136. In yet another embodiment, the second port conveys light from the first light fixture 134 which is a lamp 135, and a second light fixture 138 that is a reflector 136.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A vehicle comprising:
    a vehicle frame;
    at least one ground engaging wheel supported to the vehicle frame;
    a locomotion source that: (1) is operatively supported to the vehicle frame; (2) provides locomotion for the vehicle; and, (3) comprises a first gas transfer conduit;
    at least one vehicle bumper supported to the vehicle frame, the vehicle bumper comprising a first opening;
    a first light fixture that is operatively supported to the vehicle bumper;
    a first bumper faceplate that: (1) is operatively attached to the vehicle bumper juxtaposed to the first opening in the vehicle bumper; and (2) has first and second ports;
    wherein the first gas transfer conduit conveys a gas through the first opening in the bumper and through the first port in the first bumper faceplate; and,
    wherein the light fixture conveys light through the second port in the first bumper faceplate.

2. The vehicle of claim 1 wherein the first light fixture is a lamp that provides artificial light through the second port in the first bumper faceplate.

3. The vehicle of claim 1 wherein the first light fixture is a reflector that reflects light through the second port in the first bumper faceplate.

4. The vehicle of claim 1 wherein:
    the first light fixture is a lamp that provides artificial light through the second port in the first bumper faceplate;
    the vehicle further comprises a second light fixture that is operatively supported to the vehicle bumper; and,
    the second light fixture is a reflector that reflects light through the second port in the first bumper faceplate.

5. The vehicle of claim 1 wherein the first gas transfer conduit discharges exhaust fumes through the first opening in the bumper and through the first port in the first bumper faceplate.

6. The vehicle of claim 1 wherein the first gas transfer conduit conveys atmospheric air through the first port in the first bumper faceplate, the first opening in the bumper, and to the locomotion source.

7. The vehicle of claim 1 wherein:
    the vehicle bumper comprises a second opening;
    a locomotion source comprises a second gas transfer conduit; and,
    the vehicle further comprises:
        a second light fixture that is operatively supported to the vehicle bumper; and,
        a second bumper faceplate that: (1) is operatively attached to the vehicle bumper juxtaposed to the second opening in the vehicle bumper; and (2) has first and second ports;
    wherein the second gas transfer conduit conveys a gas through the second opening in the bumper and through the first port in the second bumper faceplate; and,
    wherein the second light fixture conveys light through the second port in the second bumper faceplate.

8. The vehicle of claim 7 wherein:
    the locomotion source comprises an internal combustion engine;
    the vehicle bumper is attached to the rear of the vehicle;
    the first gas transfer conduit discharges exhaust fumes through the first opening in the bumper and through the first port in the first bumper faceplate; and,
    the second gas transfer conduit discharges exhaust fumes through the second opening in the bumper and through the first port in the second bumper faceplate.

9. The vehicle of claim 1 wherein:
    first gas transfer conduit is operatively attached to the first bumper faceplate.

10. The vehicle of claim 9 wherein:
    the first bumper faceplate comprises a conduit member that: (1) extends inward from an outside surface of the first bumper faceplate; and, (2) is operatively attached to the first gas transfer conduit.

* * * * *